United States Patent Office 3,637,614
Patented Jan. 25, 1972

3,637,614
SOLVENT SOLUBLE DRY SOIL RESISTANT FLUOROPOLYMERS
Edward J. Greenwood, Newark, Del., assignor to E. I. du Pont de Nemours and Company, Wilmington, Del.
No Drawing. Continuation-in-part of application Ser. No. 803,093, Feb. 27, 1969. This application Aug. 19, 1969, Ser. No. 851,489
Int. Cl. C08f 15/40, 15/18
U.S. Cl. 260—80.72         27 Claims

ABSTRACT OF THE DISCLOSURE

A fluorinated oil and water repellent and dry soil resistant copolymer having an inherent viscosity as a 0.5% solution in trichlorotrifluoroethane at 30° C. of from about 0.05 to 0.8 selected from units derived from monomers having the structure:

(I)
(a) $R_fCH_2CH_2O_2CCH=CH_2$,
(b) $R'O_2CC(CH_3)=CH_2$, and optionally
(c) $R''O_2CC(CH_3)=CH_2$, wherein the sum of the weight of units derived from (b) and (c) is from about 15% to 35% by weight of the total copolymer or:

(II)
(a') $R_fCH_2CH_2O_2CC(CH_3)=CH_2$,
(b') $R'O_2CCH=CH_2$, and optionally
(c') $R''O_2CCH=CH_2$, wherein the sum of the weight of units derived from (b') and (c') is from about 15% to 35% by weight of the copolymer; and wherein $R_f$ is a perfluoroalkyl group having from 4 to 14 carbon atoms, R' is an alkyl group having from 1 to 18 carbon atoms and R'' is a glycidyl group. The copolymers are useful in treating textile fabrics to render said fabrics oil and water-repellent and dry soil resistant and they form stable solvent solutions or dispersions.

CROSS-REFERENCE TO RELATED APPLICATION

This application is a continuation-in-part of U.S. Ser. No. 803,093, filed Feb. 27, 1969, now abandoned.

BACKGROUND OF THE INVENTION

(1) Field of the invention

This invention relates to fluorinated oil and water repellent and dry soil resistant copolymers. More specifically, this invention is directed to copolymers containing (I) $F(CF_2)_nCH_2CH_2O_2CCH=CH_2$, an alkyl methacrylate and an optional glycidyl methacrylate or (II)

$$F(CF_2)_nCH_2CH_2O_2CC(CH_3)=CH_2$$

an alkylacrylate and an optional glycidyl acrylate.

(2) Description of the prior art

Commercial continuous application to textile fabrics of fluorinated polymers from solvent systems, to effect oil and water repellencies in said fabrics necessitates stable solvent baths employing solvents which are effective and yet as economical as possible for commercial use. Trichloroethylene, trichlorotrifluoroethane and difluorotetrachloroethane are all effective solvents however trichloroethylene is the preferred solvent used in the textile trade for several reasons, including the fact that it is less expensive than the chlorofluorocarbon and it is more readily recovered after evaporation when desired prior to curing the treated textile fabric.

Solvent soluble copolymers of $$R_fCH_2CH_2O_2CC(CH_3)=CH_2$$

alkylacrylate or methacrylates and glycidyl acrylate or methacrylate are known in the art however no distinction is made in these copolymers between alkyl acrylate, alkyl methacrylate, glycidyl acrylate and glycidyl methacrylate or possible combinations thereof. This lack of distinction coupled with the art designated weight percent ranges of each of the monomers present results in the production of copolymers which are soluble in the chlorofluorocarbon solvents mentioned above, but which do not generally give long term stable dispersion in the commercially preferred trichloroethylene solvent. The necessity for a dispersion which is stable over extended periods of time is readily apparent, for if the dispersion should break down, valuable material would be lost and production would be halted until a new solvent bath could be prepared.

It is recognized in the art that the available fluorinated oil and water repellents are generally somewhat deficient in particulate and dry soil resistance. Dry soiling occurs when a fabric is brought into rubbing contact with dry materials such as dirt, dust and other powdery materials. The dry material is forced by physical pressure into the voids within fibers and, in the case of fabrics which have coating thereon, into the coating or impregnating material as well. Oil and water repellents on textiles only repel liquid-based stains but offer no protection against dry soiling. Removing dry soiling requires that the cleaning medium be able to reach the dry-soil particle, emulsify it and carry it away. Oil and water repellent textiles are particularly prone to dry-soiling problems because they repel the water solutions used in laundering and the solvents used in dry-cleaning hence they are much less readily cleaned than are non-repellent fabrics. An oil and water repellent material for textile application which resists dry soiling is therefore particularly valuable. Although various solutions to the dry soiling problem have been offered for aqueous-based treating system, no solvent-based system has been suggested until now.

Fluorinated copolymers have now been discovered which are soluble or dispersible in solvents such as trichloroethylene for extended periods of time, which display outstanding properties of oil and water repellency, and which effect dry soil resistance when used in treating textile fabrics.

SUMMARY OF THE INVENTION

The present invention is directed to oil and water repellent and dry soil resistant copolymers having inherent viscosities as 0.5% solutions in trichlorotrifluoroethane at 30° C. of from about 0.05 to 0.8. These copolymers are selected from (I) Copolymers consisting essentially of units derived from:

(a) $R_fCH_2CH_2O_2CCH=CH_2$,
(b) $R'O_2CC(CH_3)=CH_2$, and optionally
(c) $R''O_2CC(CH_3)=CH_2$, wherein the sum of (b) and (c) is from 15% to 35% by weight of said copolymer; or (II) Copolymers consisting essentially of units derived from:

(a') $R_fCH_2CH_2O_2CC(CH_3)=CH_2$,
(b') $R'O_2CCH=CH_2$, and optionally
(c') $R''O_2CCH=CH_2$, wherein the sum of (b') and (c') is from 15% to 35% by weight of said copolymer. In both I and II above, $R_f$ is a perfluoroalkyl group of from 4 to 14 carbons, R' is an alkyl group of from 1 to 18 carbons and R'' is a glycidyl group.

DESCRIPTION OF THE INVENTION

The fluorinated copolymers of this invention are divisible into two groups. The first group consists of polymers containing units derived from the fluorinated acrylate monomer $R_fCH_2CH_2O_2CCH=CH_2$ wherein $R_f$ is perfluoroalkyl having from 4 to 14 carbon atoms, an alkyl methacrylate of the formula $R'O_2CC(CH_3)=CH_2$ where $R'$ is alkyl having from 1 to 18 carbons, and optionally glycidyl methacrylate. To obtain desired dispersibility in trichloroethylene, the combined concentration of alkyl methacrylate and glycidyl methacrylate must be in the range of 15% to 35% by weight of the copolymer. If there is less than 15% present, the desired solubility or dispersibility is not obtained. If more than 35% of the combined monomers are present, the resulting copolymers are not soluble in trichloroethylene. Likewise, if $R'$ contains more than 2 carbon atoms, glycidyl methacrylate should be present and the alkyl methacrylate must comprise at least 5% by weight and the glycidyl methacrylate at least 7% by weight of said copolymer regardless of the amount of the other comonomer present if the desired solubility or dispersibility in trichloroethylene and dry soil resistance are to be obtained.

The second group consist of copolymers containing units derived from the fluorinated methacrylate monomer $R_fCH_2CH_2O_2CC(CH_3)=CH_2$ wherein $R_f$ is perfluoroalkyl having from 4 to 14 carbon atoms, an alkyl acrylate of the formula $R'O_2CCH=CH_2$ where $R'$ is alkyl having from 1 to 18 carbons, and optionally glycidyl acrylate. To obtain the desired dispersibility in trichloroethylene with these polymers, the combined concentration of alkyl acrylate and glycidyl acrylate must be in the range of 15% to 35% by weight of the copolymer and if $R'$ contains more than 2 carbon atoms, glycidyl acrylate should be present with the combined concentration of alkyl acrylate and glycidyl acrylate being in the range of 21% to 34% weight of the copolymer with the alkyl acrylate comprising at least 5% and the glycidyl acrylate at least 6.8% of the copolymer. When less or more than these specified amounts of alkyl and/or glycidyl acrylate are present, the desired solubility or dispersion stability and/or dry soil resistance will not be obtained.

In each group one or two, when $R'$ is $C_{1-2}$ the glycidyl acrylate or methacrylate, if present, should not exceed 12% by weight of the total weight of the copolymer.

It is also essential in order to obtain the desired results that acrylate monomer or comonomers be used with the fluoroalkyl methacrylate monomer and methacrylate monomer or comonomers be used with the fluoroalkyl acrylate monomer. If one or both of the comonomers is the same type as the fluoroalkyl ester, i.e., one or both are acrylates with the fluoroalkyl acrylate monomer, the desired results are not obtained and the needed solubility or dispersibility in trichloroethylene is not obtained.

The alkyl group, i.e., $R'$, of the alkyl acrylate or alkyl methacrylate monomer may contain from 1 to 18 carbons. From a standpoint of solvent solubility, particularly in trichloroethylene, 8 to 12 carbons are preferred. In regard to dry soil resistance however, the results of testing utilizing alkyls of 1 or 2 carbons for $R'$ render them preferable with respect to this particular property.

It is further essential in order to obtain the desired dry soil resistance and solvent solubility, that the copolymers of this invention be prepared in a solution polymerization system and that the resulting copolymers must have inherent viscosities in the range of 0.05 to 0.8 as 0.5% by weight solution in trichlorotrifluoroethane at 30° C. Inherent viscosity is determined by the equation $$n_i = \frac{1}{C} \ln\left(\frac{n}{n_o}\right)$$

wherein $n_i$ is the inherent viscosity, C is the polymer concentration in grams per 100 ml. of solution, ln is the natural logarithm, $n$ is the viscosity of solution and $n_o$ is the viscosity of the solvent. If $R'$ has 1 or 2 carbon atoms, it is preferable that the inherent viscosity be in the range of 0.05 to 0.45 and most preferably in the range of 0.15 to 0.25.

If, however, $R'$ contains more than 2 carbon atoms, the resulting copolymers preferably should have inherent viscosities in the range of 0.27 to 0.8 as 0.5% by weight solution in trichlorotrifluoroethane at 30° C. Fabrics treated with copolymers having viscosities below the minimums set forth above lack dry-cleaning durability; while copolymers with viscosities above the maximum lack the desired solubility or dispersibility in trichloroethylene.

Solution polymerization of the particular monomers used to prepare the fluorinated copolymers of this invention in a solvent such as trichlorotrifluoroethane generally gives copolymers in the desired inherent viscosity range without addition of molecular weight control agents such as dodecyl mercaptan. If other polymerization solvents are used, care should be taken to determine the effect on inherent viscosity. While a number of solvents could be used, the perchlorofluoroalkanes and particularly trichlorotrifluoroethane and difluorotetrachloroethane are found to be most useful. With very inert solvents such as benzene, a molecular weight control agent may be necessary. Solvents which are known to interact with polymerizations, e.g., acetone, ethanol, toluene, tertiary hydrocarbons, etc., should generally be avoided. Agents such as dodecyl mercaptan can be used in trichlorotrifluoroethane if lower inherent viscosities are desired.

The solution polymerization generally follows well-known techniques. The monomers are dissolved in the solvent, a soluble initiator is added and then the solution is heated at a temperature which gives a convenient decomposition rate of the initiator used until polymerization is essentially complete. The preferred initiator-solvent systems utilized range in temperature from 40° C. to 75° C., however, systems having broader temperature ranges are also useful. Solvent soluble initiators include azonitriles such as azobisisobutyronitrile, peroxyanhydrides such as benzoyl peroxide or lauroyl peroxide, peroxyesters such as tert-butyl perbenzoate or ditert-alkyl peroxides such as ditert-butyl peroxide. Azobisisobutyronitrile is the preferred initiator. The resulting polymers can be isolated readily by evaporation of the solvent.

The copolymer solutions prepared as described above are usually more concentrated than needed or desired for application to textiles. The copolymer solutions may be diluted to the desired concentration using the polymerization solvent such as trichlorotrifluoroethane but most users prefer to use a somewhat less expensive diluting solvent such as trichloroethylene.

The fluorinated copolymers of this invention are applied to textiles from trichloroethylene solution using any convenient application technique, for example, spraying, dipping, curtain coating, padding or the like. The solvent is then evaporated and, if desired or necessary, the treated textile is cured. The fabrics so treated display oil and water repellency and dry soil resistance.

Although the copolymers of this invention can be applied to textiles alone, it is preferable to coapply the copolymers with certain other materials in many cases. If durable finishes are desired, it is preferable to apply the terpolymers with certain melamine-formaldehyde condensates and/or reactive polymers and optionally paraffin wax as described by Read in British specification 1,058,955. The reactive copolymers include (1) copolymers of long chain alkyl methacrylates such as stearyl methacrylate and dialkylaminoalkyl methacrylates such as diethylaminoethyl methacrylate, (2) chlorosulfonated hydrocarbons such as chlorosulfonated polyethylene, (3) polyurethanes containing free isocyanate groups and (4) copolymers containing an acyl halide group such as the terpolymers of ethylene, vinyl acetate and methacrylyl chloride. At least 3% by weight of the melamineformaldehyde condensate or reactive polymer should be present. The fluorinated terpolymer should comprise 5% to 97% of such mixtures on a solids basis. In general, such systems are cured after evaporation of the solvent, e.g., by heating at 140°–160° C. for one minute.

When a nondurable finish is desired, it is preferable to coapply the fluorinated terpolymers of this invention with melamine-formaldehyde condensates, certain nonreactive nonfluorinated polymers such as ethylene/propylene/1,4-hexadiene terpolymers and a wax. Such mixtures, on a solids basis, preferably contain 48% to 87% of the fluorinated terpolymer, 4% to 17% of the nonreactive terpolymer, 6% to 23% of the melamine condensate and 3% to 13% wax. This system is more fully described by Read in Netherlands application 66,08665, published Dec. 25, 1966. In general, these systems are not cured after evaporation of the solvent.

A preparation of the fluorinated methacrylate monomers $R_1CH_2CH_2O_2CC(CH_3)=CH_2$ is described by Fasick and Raynolds in U.S. Pat. 3,282,905. In the preferred methacrylate monomers, $R_f$ is a mixture of straight chain perfluoroalkyl groups containing 6, 8, and 10 carbons predominantly. A preparation of the fluorinated acrylate monomers $R_fCH_2CH_2O_2CH=CH_2$ is also described by Fasick and Raynolds, making the appropriate substitution of acrylic acid derivatives. The alkyl acrylates and methacrylates, glycidyl acrylate and methacrylate are all commercially available monomers.

The prefered embodiments of this invention when R' of the alkyl acrylate or alkyl methacrylate contain more than 2 carbon atoms are copolymers of 74–75%

$$R_fCH_2CH_2O_2CC(CH_3)=CH_2$$

where $R_f$ is a mixture of perfluoroalkyl groups containing 6, 8, 10, 12 and 14 carbon atoms, 14.0% 2-ethylhexyl acrylate and 11–12% glycidyl acrylate. A specific polymer of choice contains 74.4%

14.0% 2-ethylhexyl acrylate and 1.6% glycidyl acrylate and has inherent viscosities in the range of 0.47 to 0.67.

The prefered embodiments of this invention when R' contains 1 or 2 carbon atoms are (1) a copolymer of 85% $R_fCH_2CH_2O_2CC(CH_3)=CH_2$, 10% methylacrylate and 5% glycidyl acrylate, $R_f$ is $F(CF_2)_n$—wherein $n$ is 6, 8, 10, 12 and 14 in the weight ratio 35/30/18/8/3 and the monomer has an average molecular weight of 522, and (2) a copolymer of 75%

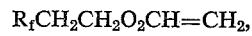

24.5% methyl methacrylate and 0.5% glycidyl methacrylate, wherein $R_f$ is the same $F(CF_2)_n$—as above and the monomer has an average molecular weight of 508. Each of these two copolymers has an inherent viscosity in the range of 0.15 to 0.25.

The following examples are intended to be merely illustrative of the invention and not in limitation thereof. Unless otherwise indicated, all quantities are by weight.

In Examples 1–6 the fluorinated monomers had the following characteristics:

$$R_fCH_2CH_2O_2CC(CH_3)=CH$$

$R_f$ is $F(CF_2)_n$ wherein $n$ is 6, 8, 10, 12 and 14 in the weight ratio 35/30/18/8/3, average molecular weight 522, 58.0% fluorine.

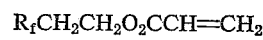

$R_f$ is the same as above, average molecular weight 508, 59.4% fluorine.

The copolymers utilized in Examples 1–6 and described in Tables I and II were prepared by the procedure described in Example 1.

EXAMPLE 1

A mixture of three monomers (see Tables I and II for specific monomers, weight percents and properties) was placed in a vessel and diluted with 55 parts of trichlorotrifluoroethane and 110 parts difluorotetrachloroethane. The mixture was stirred and heated at 70–74° C. while being purged with nitrogen. After one hour 0.1 part azobisisobutyronitrile was added after which heating and stirring were continued for 3 hours. A further 0.1 part of azonitrile was added and heating with stirring was continued for an additional 12 hours. The polymers were isolated by evaporation of solvent.

In several cases i.e., 24, 25 and 26 of Table I, and 16, 17, 27, 29, 39, 40 and 41 of Table II, copolymers having lower inherent viscosities than were obtained by direct polymerization were desired, and these lower inherent viscosities were obtained by adding small amounts of dodecyl mercaptan, about 0.1–0.2 part, to the polymerization mixture.

TABLE I.—COPOLYMERS OF $R_fCH_2CH_2O_2CC=CH_2$

| Polymer No. I- | FA,[1] wt. parts | Percent in polymer | HCMA[1] alkyl | HCMA, wt. parts | HCMA, percent in polymer | GMA,[1] wt. parts | GMA, percent in polymer | HCMA plus GMA percent in polymer | Inherent viscosity | Trichloroethylene dispersibility |
|---|---|---|---|---|---|---|---|---|---|---|
| 1 | 64 | 74.4 | Butyl | 16 | 18.6 | 6 | 7.0 | 25.6 | 0.49 | Yes. |
| 2 | 64 | 74.4 | do | 12 | 14.0 | 10 | 11.6 | 25.6 | 0.48 | Yes. |
| 3 | 64 | 74.4 | 2-ethylhexyl | 16 | 18.6 | 6 | 7.0 | 25.6 | 0.44 | Yes. |
| 4 | 64 | 74.4 | do | 12 | 14.0 | 10 | 11.6 | 25.6 | 0.55 | Yes. |
| 5 | 64 | 86.5 | Lauryl[2] | 4 | 5.4 | 6 | 8.1 | 13.5 | 0.19 | No. |
| 6 | 64 | 84.2 | do[2] | 2 | 2.6 | 10 | 13.2 | 15.8 | 0.23 | No. |
| 7 | 64 | 82.0 | do[2] | 4 | 5.2 | 10 | 12.8 | 18.0 | 0.28 | Yes. |
| 8 | 64 | 82.0 | do[2] | 8 | 10.3 | 6 | 7.7 | 18.0 | 0.29 | Yes. |
| 9 | 64 | 80.0 | do[2] | 6 | 7.5 | 10 | 12.5 | 20.0 | 0.36 | Yes. |
| 10 | 64 | 78.1 | do[2] | 8 | 9.7 | 10 | 12.2 | 21.9 | 0.39 | Yes. |
| 11 | 64 | 78.1 | do[2] | 12 | 14.6 | 6 | 7.3 | 21.9 | 0.38 | Yes. |
| 12 | 64 | 74.4 | do[2] | 16 | 18.6 | 6 | 7.0 | 25.6 | 0.50 | Yes. |
| 13 | 64 | 74.4 | do[2] | 12 | 14.0 | 10 | 11.6 | 25.6 | 0.45 | Yes. |
| 14 | 64 | 88.9 | Stearyl[2] | 2 | 2.8 | 6 | 8.3 | 11.1 | 0.20 | No. |
| 15 | 64 | 86.5 | do[2] | 4 | 5.4 | 6 | 8.1 | 13.5 | 0.22 | No. |
| 16 | 64 | 84.2 | do[2] | 6 | 7.9 | 6 | 7.9 | 15.8 | 0.24 | No. |
| 17 | 64 | 84.2 | do[2] | 2 | 2.6 | 10 | 13.2 | 15.8 | 0.23 | No. |
| 18 | 64 | 82.0 | do[2] | 4 | 5.2 | 10 | 12.8 | 18.0 | 0.27 | Yes. |
| 19 | 64 | 82.0 | do[2] | 8 | 10.3 | 6 | 7.7 | 18.0 | 0.31 | Yes. |
| 20 | 64 | 80.0 | do[2] | 6 | 7.5 | 10 | 12.5 | 20.0 | 0.34 | Yes. |
| 21 | 64 | 78.1 | do[2] | 8 | 9.7 | 10 | 12.2 | 21.9 | 0.47 | Yes. |
| 22 | 64 | 74.4 | do[2] | 16 | 18.6 | 6 | 7.0 | 25.6 | 0.41 | Yes. |
| 23 | 64 | 74.4 | do[2] | 12 | 14.0 | 10 | 11.6 | 25.6 | 0.45 | Yes. |
| 24 | 64 | 74.4 | Lauryl[2] | 12 | 14.0 | 10 | 11.6 | 25.6 | 0.13 | No. |
| 25 | 64 | 74.4 | do[2] | 12 | 14.0 | 10 | 11.6 | 25.6 | 0.20 | No. |
| 26 | 64 | 74.4 | do[2] | 12 | 14.0 | 10 | 11.6 | 25.6 | 0.21 | No. |

[1] FA=$R_fCH_2CH_2O_2CCH=CH_2$ as described. HCMA=Alkyl methacrylate, alkyl as indicated. GMA=Glycidyl methacrylate.

[2] Lauryl=Commercial dodecyl, mole weight 262. Stearyl=Commercial octadecyl, mole weight 332.

TABLE II.—COPOLYMERS OF $R_fCH_2CH_2O_2CC(CH_3)=CH_2$

| Polymer No. II- | FMA,[1] wt. parts | Percent in polymer | HCA,[1] alkyl | HCA, wt. parts | HCA percent in polymer | GA,[1] wt. parts | GA, percent in polymer | HCA plus GA, percent | Inherent viscosity | Trichloro-ethylene dispersibility |
|---|---|---|---|---|---|---|---|---|---|---|
| 1 | 64 | 78.1 | Methyl | 12 | 14.6 | 6 | 7.3 | 21.9 | 0.63 | No. |
| 2 | 64 | 74.4 | ....do.... | 16 | 18.6 | 6 | 7.0 | 25.6 | 0.56 | No. |
| 3 | 64 | 78.1 | Ethyl | 12 | 14.6 | 6 | 7.3 | 21.9 | 0.69 | Yes. |
| 4 | 64 | 74.4 | ....do.... | 16 | 18.6 | 6 | 7.0 | 25.6 | 0.72 | Yes. |
| 5 | 64 | 74.4 | ....do.... | 12 | 14.0 | 10 | 11.6 | 25.6 | 0.54 | Yes. |
| 6 | 64 | 67.8 | ....do.... | 24 | 25.4 | 6.4 | 6.8 | 32.2 | 0.67 | Yes. |
| 7 | 64 | 74.4 | Butyl | 16 | 18.6 | 6 | 7.0 | 25.6 | 0.67 | Yes. |
| 8 | 64 | 74.4 | ....do.... | 12 | 14.0 | 10 | 11.6 | 25.6 | 0.70 | Yes. |
| 9 | 64 | 78.1 | Octyl | 12 | 14.6 | 6 | 7.3 | 21.9 | 0.44 | Yes. |
| 10 | 64 | 74.4 | ....do.... | 16 | 18.6 | 6 | 7.0 | 25.6 | 0.41 | Yes. |
| 11 | 64 | 85.1 | 2-ethylhexyl | 4.8 | 6.4 | 6.4 | 8.5 | 14.9 | 0.32 | No. |
| 12 | 64 | 81.6 | ....do.... | 14.4 | 18.4 | 0 | 0 | 18.4 | 0.22 | No. |
| 13 | 64 | 78.1 | ....do.... | 12 | 14.6 | 6 | 7.3 | 21.9 | 0.44 | Yes. |
| 14 | 64 | 75.5 | ....do.... | 14.4 | 17.0 | 6.4 | 7.5 | 24.5 | 0.56 | Yes. |
| 15 | 64 | 75.5 | ....do.... | 14.4 | 17.0 | 6.4 | 7.5 | 24.5 | 0.51 | Yes. |
| 16 | 64 | 75.5 | ....do.... | 14.4 | 17.0 | 6.4 | 7.5 | 24.5 | 0.54 | Yes. |
| 17 | 64 | 74.4 | ....do.... | 16 | 18.6 | 6 | 7.0 | 25.6 | 0.46 | Yes. |
| 18 | 64 | 74.4 | ....do.... | 12 | 14.0 | 10 | 11.6 | 25.6 | 0.57 | Yes. |
| 19 | 64 | 74.4 | ....do.... | 12 | 14.0 | 10 | 11.6 | 25.6 | 0.67 | Yes. |
| 20 | 64 | 74.4 | ....do.... | 12 | 14.0 | 10 | 11.6 | 25.6 | 0.64 | Yes. |
| 21 | 64 | 74.1 | ....do.... | 9.6 | 11.1 | 12.8 | 14.8 | 25.9 | 0.66 | Yes. |
| 22 | 64 | 74.1 | ....do.... | 9.6 | 11.6 | 12.8 | 14.8 | 25.9 | 0.34 | Yes. |
| 23 | 64 | 72.1 | ....do.... | 12 | 13.5 | 12.8 | 14.4 | 27.9 | 0.68 | Yes. |
| 24 | 64 | 71.0 | ....do.... | 16.6 | 18.4 | 9.6 | 10.6 | 29.0 | 0.67 | Yes. |
| 25 | 64 | 70.2 | ....do.... | 14.4 | 15.8 | 12.8 | 14.0 | 29.8 | | Gelled. |
| 26 | 64 | 68.4 | ....do.... | 16.8 | 17.9 | 12.8 | 13.7 | 31.6 | 0.68 | Yes. |
| 27 | 64 | 67.8 | ....do.... | 24 | 25.4 | 6.4 | 6.8 | 32.2 | 0.51 | Yes. |
| 28 | 64 | 66.7 | ....do.... | 19.2 | 20.0 | 12.8 | 13.3 | 33.3 | 0.70 | Yes. |
| 29 | 64 | 66.7 | ....do.... | 19.2 | 20.0 | 12.8 | 13.3 | 33.3 | 0.30 | Yes. |
| 30 | 64 | 65.6 | ....do.... | 14.4 | 14.8 | 19.2 | 19.7 | 34.5 | | Gelled. |
| 31 | 64 | 86.5 | Lauryl [2] | 4 | 5.4 | 6 | 8.1 | 13.5 | 0.27 | No. |
| 32 | 64 | 82.0 | ....do.[2] | 8 | 10.3 | 6 | 7.7 | 18.0 | 0.32 | No. |
| 33 | 64 | 80.0 | ....do.[2] | 16 | 20.0 | 0 | 0 | 20.0 | 0.30 | No. |
| 34 | 64 | 78.1 | ....do.[2] | 12 | 14.6 | 6 | 7.3 | 21.9 | 0.33 | Yes. |
| 35 | 64 | 78.1 | ....do.[2] | 16 | 19.5 | 2 | 2.4 | 21.9 | 0.53 | No. |
| 36 | 64 | 76.1 | ....do.[2] | 16 | 19.1 | 4 | 4.8 | 23.9 | 0.53 | No. |
| 37 | 64 | 74.4 | ....do.[2] | 16 | 18.6 | 6 | 7.0 | 25.6 | 0.23 | Yes. |
| 38 | 64 | 74.4 | ....do.[2] | 12 | 14.0 | 10 | 11.6 | 25.6 | 0.45 | Yes. |
| 39 | 64 | 74.4 | ....do.[2] | 12 | 14.0 | 10 | 11.6 | 25.6 | 0.13 | No. |
| 40 | 64 | 74.4 | ....do.[2] | 12 | 14.0 | 10 | 11.6 | 25.6 | 0.23 | No. |
| 41 | 64 | 74.4 | ....do.[2] | 12 | 14.0 | 10 | 11.6 | 25.6 | 0.30 | Yes. |
| 42 | 64 | 74.4 | 2-ethylhexyl | 12 | 14.0 | 20 | 11.6 | 25.6 | 0.47 | No. |

[1] FMA = $R_fCH_2CH_2O_2CC(CH_3)=CH_2$ as described. HCA=Alkyl acrylate, alkyl as indicated. GA=Glycidyl acrylate.
[2] Lauryl=Commercial dodecyl, mole weight 262.

EXAMPLE 2

Selected copolymers were converted to 7.5% A.I. solutions or dispersions in trichloroethylene and utilizing these solutions or dispersions, the following formulations were prepared. The weight of the 7.5% solutions or dispersions are indicated.

Formulation

Component: Percent OWF
Copolymer _____ 1.6
Dispersion or solution.
Additive solution (*) _____ 1.4

Percent OWF=percent on weight of fabric. Bath concentrations can be obtained by multiplying percent OWF by 100% wet pickup on fabric.
*=the additive solution was a 14% A.I. solution of solids, the solids comprising 6.1% trisbehenoyloxy-methyl-trismethoxymethyl-melamine, 4.5% chlorinated polyethylene, 3.4% paraffin wax and 86% trichloroethylene.

Each formulation was padded at about 24° C. on fabrics with the nip rolls adjusted to obtain 100% wet pickup. The padded fabrics were air dried, cured for 2 minutes at 121° C. and tested for their oil and water repellencies.

Oil repellencies were determined using the test method No. 118–1966T of the American Association of Textile Chemists and Colorists, modified in that the test oils contained a blue dye dissolved therein and the readings were taken after three minutes rather than the 30 seconds required by the test. Water repellencies were determined by test method No. 22–1964 of the American Association of Textile Chemists and Colorists. After the initial values were determined, the fabrics were subjected to one or more dry-cleanings and the oil and water repellencies were again determined.

A standard dry cleaning (DC) consists of agitating the treated fabric for 20 minutes in tetrachloroethylene containing 2% commercial dry cleaning detergent and 0.5% water. The fabrics were then dried by first centrifuging for one minute followed by drying for five minutes in a tumble dryer at 160° F. The fabrics were then pressed 15 seconds on each face at 300° F.±20° F.

The results obtained utilizing the copolymers of Table I are given in Tables III to VI while the results obtained with the polymers of Table II are given in Tables VII to X. In tables III to X, results are also reported for two fluorinated oil and water repellent polymers of the art. Art polymer A is composed of 80 parts

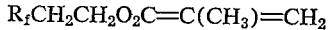
$R_fCH_2CH_2O_2C=C(CH_3)=CH_2$ 20 parts butyl methacrylate and 5 parts glycidyl methacrylate in a solution of trichlorotrifluoroethanes and difluorotetrachloroethane and was prepared according to Example 1 of Read, British specification 1,058,955. The solution of the art polymer in trichlorotrifluoroethane and difluorotetrachloroethane was diluted with trichloroethylene for use, generally to 7.5% A.I. Art polymer B is composed of 64 parts $R_fCH_2CH_2OCC(CH_3)=CH_2$, 12 parts lauryl methacrylate and 10 parts glycidyl methacrylate, and was prepared by a process analogous to the preparation in Example 1 of this specification. This polymer solution in trichlorotrifluoroethane and difluorotetrachloroethane was also diluted to 7.5% A.I. with trichloroethylene.

The compositions were applied to several fabrics designated A, B, C, D, E, F. Fabrics A, B and D were each 100% spun rayon upholstery fabrics, A and B were highly sized. Fabric C was 60% spun rayon and 40% filament rayon upholstery fabric; fabric E was 100% woolen twill, while fabric F was undyed, mercerized cotton poplin, 1.6 yds./pound.

In Tables III–X, the specific copolymers selected for use from Table I are designated I–1, I–2, etc., those selected for use from Table II are designated II-1, II-2, etc. The various column headings represent the following:

Init.—Initial oil and water repellencies after treatment but before dry cleaning.

1 DC—Oil and water repellency ratings after 1 dry cleaning.

3 DC—Oil and water repellency ratings after 3 dry cleanings.

5 DC—Oil and water repellency ratings after 5 dry cleanings.

TABLE III

| Fabric used and fluorinated copolymer used | Oil repellency | | | | Water repellency | | | |
|---|---|---|---|---|---|---|---|---|
| | Init. | 1DC | 3DC | 5DC | Init. | 1DC | 3DC | 5DC |
| Fabric A: | | | | | | | | |
| I-12 | 5 | 1 | 2 | 2 | 70 | 50 | 50 | 50 |
| I-13 | 6 | 6 | 6 | 6 | 50 | 50 | 50 | 50 |
| I-1 | 6 | 6 | 6 | 6 | 50 | 50 | 50 | 50 |
| I-2 | 6 | 6 | 6 | 6 | 70 | 50 | 50 | 50 |
| I-3 | 4 | 3 | 4 | 3 | 70 | 50 | 50 | 50 |
| I-4 | 6 | 6 | 6 | 6 | 70 | 70 | 50 | 50 |
| Art-A | 5 | 2 | 3 | 1 | 50 | 50 | 50 | 50 |
| Art-B | 6 | 4 | 5 | 2 | 50 | 50 | 50 | 50 |
| Fabric C: | | | | | | | | |
| I-12 | 5 | 2 | 1 | 0 | 70 | 70 | 50 | 50 |
| I-13 | 7 | 6 | 5 | 6 | 70 | 50 | 50 | 50 |
| I-1 | 6 | 7 | 7 | 6 | 70 | 50 | 50 | 50 |
| I-2 | 6 | 7 | 7 | 7 | 50 | 50 | 50 | 50 |
| I-3 | 4 | 5 | 5 | 2 | 70 | 50 | 50 | 50 |
| I-4 | 6 | 7 | 7 | 6 | 50 | 50 | 50 | 50 |
| Art-A | 5 | 2 | 2 | 0 | 70 | 50 | 50 | 50 |
| Art-B | 6 | 6 | 3 | 2 | 70 | 50 | 50 | 50 |
| Fabric E: | | | | | | | | |
| I-12 | 6 | 3 | 3 | 0 | 80 | 80 | 70 | 70 |
| I-13 | 8 | 6 | 5 | 4 | 80 | 80 | 70 | 80 |
| I-1 | 7 | 6 | 6 | 5 | 80 | 70 | 70 | 80 |
| I-2 | 7 | 6 | 6 | 5 | 90 | 80 | 70 | 70 |
| I-3 | 5 | 5 | 5 | 2 | 80 | 80 | 80 | 80 |
| I-4 | 7 | 6 | 5 | 5 | 80 | 80 | 70 | 70 |
| Art-A | 5 | 2 | 2 | 1 | 100 | 80 | 70 | 0 |
| Art-B | 7 | 6 | 4 | 1 | 90 | 80 | 70 | 80 |

TABLE IV

| Fabric used and fluorinated copolymer used | Oil repellency | | | | Water repellency | | | |
|---|---|---|---|---|---|---|---|---|
| | Init. | 1DC | 3DC | 5DC | Init. | 1DC | 3DC | 5DC |
| Fabric A: | | | | | | | | |
| I-23 | 7 | 5 | 1 | 0 | 70 | 70 | 0 | 0 |
| I-21 | 6 | 7 | 6 | 6 | 80 | 70 | 50 | 50 |
| I-20 | 6 | 7 | 7 | 6 | 80 | 50 | 50 | 50 |
| I-18 | 6 | 7 | 6 | 6 | 80 | 70 | 50 | 50 |
| Art-A | 4 | 1 | 0 | 0 | 70 | 50 | 0 | 0 |
| Art-B | 6 | 6 | 0 | 0 | 80 | 50 | 50 | 50 |
| Fabric B: | | | | | | | | |
| I-23 | 8 | 6 | 4 | 2 | 70 | 50 | 50 | 50 |
| I-21 | 7 | 7 | 6 | 6 | 80 | 50 | 50 | 50 |
| I-20 | 6 | 7 | 6 | 6 | 80 | 50 | 50 | 50 |
| I-18 | 6 | 7 | 6 | 6 | 80 | 50 | 50 | 50 |
| Art-A | 3 | 3 | 0 | 0 | 70 | 50 | 50 | 50 |
| Art-B | 5 | 6 | 1 | 1 | 70 | 50 | 50 | 50 |
| Fabric C: | | | | | | | | |
| I-23 | 7 | 7 | 5 | 0 | 70 | 50 | 50 | 50 |
| I-21 | 7 | 7 | 7 | 7 | 70 | 50 | 50 | 50 |
| I-20 | | | 7 | 7 | | | 50 | 50 |
| I-18 | | | 7 | 7 | | | 50 | 50 |
| Art-A | 5 | 2 | 0 | 0 | 70 | 50 | 0 | 50 |
| Art-B | 6 | 6 | 0 | 0 | 70 | 50 | 50 | 50 |
| Fabric D: | | | | | | | | |
| I-23 | 8 | 6 | 0 | 0 | 80 | 70 | 0 | 50 |
| I-21 | 6 | 7 | 7 | 6 | 80 | 70 | 50 | 50 |
| I-20 | 6 | 6 | 6 | 7 | 80 | 70 | 70 | 50 |
| I-18 | 6 | 7 | 7 | 6 | 80 | 70 | 70 | 50 |
| Art-A | 4 | 0 | 0 | 0 | 70 | 50 | 0 | 0 |
| Art-B | 5 | 6 | 0 | 0 | 70 | 50 | 0 | 50 |
| Fabric E: | | | | | | | | |
| I-23 | 7 | 6 | 3 | 2 | 90 | 80 | 70 | 80 |
| I-21 | 7 | 7 | 5 | 6 | 90 | 80 | 80 | 80 |
| I-20 | 8 | 7 | 6 | 6 | 90 | 80 | 80 | 80 |
| I-18 | 7 | 7 | 4 | 6 | 100 | 80 | 80 | 80 |
| Art-A | 6 | 2 | 0 | 1 | 100 | 70 | 70 | 80 |
| Art-B | 6 | 6 | 1 | 2 | 100 | 70 | 70 | 70 |
| Fabric F: | | | | | | | | |
| I-23 | 2 | 2 | 3 | 3 | 80 | 70 | 50 | 50 |
| I-21 | 2 | 3 | 5 | 5 | 80 | 70 | 70 | 70 |
| I-20 | 3 | 4 | 5 | 5 | 80 | 80 | 70 | 50 |
| I-18 | 2 | 3 | 5 | 5 | 80 | 80 | 70 | 70 |
| Art-A | 2 | 2 | 2 | 6 | 80 | 50 | 50 | 50 |
| Art-B | 2 | 2 | 3 | 3 | 80 | 70 | 50 | 70 |

TABLE V

| Fabric used and fluorinated copolymer used | Oil repellency | | | | Water repellency | | | |
|---|---|---|---|---|---|---|---|---|
| | Init. | 1DC | 3DC | 5DC | Init. | 1DC | 3DC | 5DC |
| Fabric B: | | | | | | | | |
| I-7 | 6 | 6 | 4 | 4 | 80 | 70 | 50 | 50 |
| I-9 | 4 | 5 | 5 | 4 | 80 | 70 | 50 | 50 |
| I-10 | 6 | 6 | 6 | 6 | 80 | 50 | 70 | 50 |
| Art-A | 5 | 4 | 0 | 0 | 80 | 50 | 50 | 50 |
| Art-B | 6 | 6 | 3 | 1 | 80 | 70 | 50 | 50 |

TABLE V—Continued

| Fabric used and fluorinated copolymer used | Oil repellency | | | | Water repellency | | | |
|---|---|---|---|---|---|---|---|---|
| | Init. | 1DC | 3DC | 5DC | Init. | 1DC | 3DC | 5DC |
| Fabric C: | | | | | | | | |
| I-7 | 6 | 7 | 5 | 5 | 70 | 50 | 50 | 50 |
| I-9 | 4 | 5 | 6 | 6 | 70 | 50 | 50 | 50 |
| I-10 | 6 | 6 | 7 | 6 | 70 | 50 | 50 | 50 |
| Art-A | 5 | 3 | 0 | 1 | 70 | 0 | 0 | 0 |
| Art-B | 6 | 5 | 1 | 1 | 70 | 50 | 0 | 0 |
| Fabric D: | | | | | | | | |
| I-7 | 6 | 6 | 5 | 0 | 80 | 70 | 50 | 50 |
| I-9 | 5 | 6 | 6 | 5 | 80 | 50 | 50 | 50 |
| I-10 | 6 | 7 | 6 | 6 | 80 | 70 | 50 | 50 |
| Art-A | 5 | 1 | 0 | 0 | 80 | 50 | 0 | 0 |
| Art-B | 6 | 5 | 0 | 0 | 80 | 50 | 0 | 0 |
| Fabric E: | | | | | | | | |
| I-7 | 8 | 6 | 4 | 2 | 80 | 80 | 70 | 70 |
| I-9 | 7 | 7 | 6 | 6 | 90 | 80 | 80 | 70 |
| I-10 | 7 | 7 | 6 | 5 | 90 | 80 | 80 | 70 |
| Art-A | 6 | 2 | 2 | 1 | 100 | 70 | 80 | 80 |
| Art-B | 6 | 6 | 2 | 2 | 90 | 70 | 70 | 80 |
| Fabric F: | | | | | | | | |
| I-7 | 3 | 3 | 3 | 3 | 80 | 70 | 50 | 50 |
| I-9 | 1 | 1 | 3 | 2 | 80 | 70 | 50 | 50 |
| I-10 | 3 | 3 | 3 | 5 | 80 | 50 | 70 | 50 |
| Art-A | 2 | 2 | 3 | 1 | 80 | 70 | 50 | 50 |
| Art-B | 2 | 2 | 1 | 2 | 80 | 50 | 50 | 50 |

Table VI below compares four copolymers of

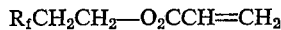

$$R_fCH_2CH_2-O_2CCH=CH_2$$

having the same composition, varying only in inherent viscosity. Polymer I-13 represents polymers within the critical inherent viscosity limits while polymers I-24, 25 and 26 all have inherent viscosities below the critical lower limit. Art polymers A and B are also included for comparison.

TABLE VI

| Fabric used and fluorinated copolymer used | Oil repellency | | | Water repellency | | |
|---|---|---|---|---|---|---|
| | Init. | 1DC | 3DC | Init. | 1DC | 3DC |
| Fabric A: | | | | | | |
| I-13 | 6 | 6 | 5 | 70 | 70 | 70 |
| I-24 | 5 | 4 | 1 | 70 | 70 | 0 |
| I-25 | 5 | 6 | 2 | 70 | 70 | 0 |
| I-26 | 5 | 4 | 1 | 70 | 70 | 0 |
| Art-A | 4 | 2 | 0 | 70 | 70 | 0 |
| Art-B | 5 | 3 | 1 | 70 | 70 | 50 |
| Fabric B: | | | | | | |
| I-13 | 6 | 6 | 5 | 70 | 70 | 50 |
| I-24 | 5 | 5 | 1 | 70 | 70 | 0 |
| I-25 | 6 | 5 | 0 | 70 | 70 | 50 |
| I-26 | 6 | 6 | 2 | 70 | 70 | 0 |
| Art-A | 3 | 2 | 0 | 70 | 70 | 0 |
| Art-B | 4 | 5 | 0 | 70 | 70 | 50 |
| Fabric C: | | | | | | |
| I-13 | 6 | 6 | 4 | 70 | 70 | 70 |
| I-24 | 5 | 4 | 1 | 70 | 70 | 50 |
| I-25 | 5 | 5 | 3 | 70 | 70 | 50 |
| I-26 | 6 | 5 | 2 | 70 | 70 | 50 |
| Art-A | 5 | 2 | 0 | 70 | 70 | 50 |
| Art-B | 6 | 2 | 1 | 70 | 70 | 50 |
| Fabric D: | | | | | | |
| I-13 | 6 | 6 | 2 | 70 | 70 | 70 |
| I-24 | 2 | 0 | 0 | 07 | 0 | 0 |
| I-25 | 3 | 1 | 0 | 70 | 70 | 0 |
| I-26 | 4 | 0 | 0 | 70 | 50 | 0 |
| Art-A | 3 | 0 | 0 | 70 | 0 | 0 |
| Art-B | 3 | 0 | 0 | 70 | 0 | 0 |
| Fabric E: | | | | | | |
| I-13 | 7 | 6 | 1 | 80 | 70 | 70 |
| I-24 | 6 | 5 | 0 | 80 | 70 | 70 |
| I-25 | 7 | 6 | 0 | 80 | 70 | 70 |
| I-26 | 7 | 5 | 0 | 80 | 70 | 70 |
| Art-A | 2 | 2 | 0 | 80 | 70 | 70 |
| Art-B | 5 | 3 | 0 | 80 | 70 | 70 |
| Fabric F: | | | | | | |
| I-13 | 2 | 4 | 4 | 70 | 70 | 50 |
| I-24 | 2 | 3 | 4 | 70 | 50 | 50 |
| I-25 | 3 | 4 | 4 | 70 | 70 | 70 |
| I-26 | 2 | 4 | 4 | 70 | 70 | 50 |
| Art-A | 2 | 3 | 3 | 70 | 70 | 50 |
| Art-B | 2 | 2 | 2 | 70 | 70 | 70 |

TABLE VII

| Fabric used and fluorinated copolymer used | Oil repellency | | | | Water repellency | | | |
|---|---|---|---|---|---|---|---|---|
| | Init. | 1DC | 3DC | 5DC | Init. | 1DC | 3DC | 5DC |
| Fabric A: | | | | | | | | |
| II-13 | 5 | 4 | 2 | 2 | 70 | 50 | 50 | 50 |
| II-9 | 4 | 4 | 2 | 2 | 70 | 50 | 50 | 50 |
| II-34 | 6 | 2 | 2 | 2 | 70 | 70 | 50 | 50 |
| II-19 | 6 | 4 | 4 | 2 | 70 | 50 | 50 | 50 |
| Art-A | 4 | 1 | 0 | 0 | 70 | 50 | 0 | 0 |
| Fabric B: | | | | | | | | |
| II-13 | 6 | 5 | 5 | 2 | 70 | 50 | 50 | 50 |
| II-9 | 5 | 5 | 3 | 2 | 70 | 50 | 50 | 50 |
| II-34 | 6 | 4 | 2 | 2 | 70 | 50 | 50 | 50 |
| II-19 | 6 | 5 | 5 | 5 | 70 | 50 | 50 | 50 |
| Art-A | 6 | 1 | 1 | 1 | 70 | 50 | 50 | 50 |
| Fabric C: | | | | | | | | |
| II-13 | 6 | 2 | 4 | 3 | 70 | 50 | 50 | 50 |
| II-9 | 6 | 5 | 5 | 1 | 70 | 50 | 50 | 50 |
| II-34 | 6 | 4 | 2 | 2 | 70 | 50 | 50 | 50 |
| II-19 | 5 | 5 | 4 | 4 | 70 | 50 | 50 | 50 |
| Art-A | 5 | 0 | 1 | 0 | 70 | 50 | 0 | 0 |
| Fabric D: | | | | | | | | |
| II-13 | 5 | 5 | 4 | 2 | 80 | 50 | 50 | 50 |
| II-9 | 6 | 5 | 1 | 1 | 70 | 50 | 50 | 50 |
| II-34 | 6 | 5 | 0 | 1 | 70 | 50 | 50 | 50 |
| II-19 | 6 | 6 | 5 | 4 | 70 | 50 | 50 | 50 |
| Art-A | 5 | 0 | 0 | 0 | 70 | 0 | 0 | 0 |
| Fabric E: | | | | | | | | |
| II-13 | 6 | 3 | 1 | 0 | 80 | 70 | 70 | 70 |
| II-9 | 6 | 4 | 1 | 0 | 70 | 70 | 70 | 70 |
| II-34 | 7 | 1 | 0 | 0 | 80 | 70 | 70 | 70 |
| II-19 | 6 | 5 | 4 | 1 | 70 | 70 | 70 | 70 |
| Art-A | 4 | 0 | 0 | 0 | 100 | 70 | 0 | 0 |
| Fabric F: | | | | | | | | |
| II-13 | 2 | 2 | 2 | 2 | 70 | 70 | 50 | 50 |
| II-9 | 2 | 2 | 2 | 2 | 70 | 50 | 50 | 50 |
| II-34 | 2 | 2 | 1 | 1 | 70 | 50 | 50 | 50 |
| II-19 | 2 | 2 | 2 | 2 | 70 | 70 | 50 | 50 |
| Art-A | 2 | 2 | 2 | 1 | 80 | 50 | 50 | 50 |

TABLE VIII

| Fabric used and fluorinated copolymer used | Oil repellency | | | | Water repellency | | | |
|---|---|---|---|---|---|---|---|---|
| | Init. | 1DC | 3DC | 5DC | Init. | 1DC | 3DC | 5DC |
| Fabric A: | | | | | | | | |
| II-7 | 5 | 5 | 4 | 3 | 50 | 50 | 50 | 50 |
| II-8 | 5 | 5 | 4 | 4 | 70 | 50 | 50 | 50 |
| II-17 | 4 | 2 | 2 | 1 | 50 | 50 | 50 | 50 |
| II-18 | 6 | 5 | 4 | 3 | 50 | 50 | 50 | 50 |
| Art-A | 5 | 2 | 0 | 0 | 50 | 50 | 50 | 50 |
| Art-B | 6 | 4 | 1 | .1 | 50 | 50 | 50 | 50 |
| Fabric B: | | | | | | | | |
| II-7 | 5 | 6 | 4 | 4 | 50 | 50 | 50 | 50 |
| II-8 | 5 | 5 | 4 | 4 | 70 | 50 | 50 | 50 |
| II-17 | 5 | 5 | 4 | 4 | 50 | 50 | 50 | 50 |
| II-18 | 5 | 5 | 4 | 4 | 50 | 50 | 50 | 50 |
| Art-A | 5 | 5 | 0 | 0 | 70 | 50 | 50 | 50 |
| Art-B | 6 | 5 | 1 | 0 | 50 | 50 | 50 | 50 |
| Fabric C: | | | | | | | | |
| II-7 | 5 | 6 | 6 | 5 | 50 | 50 | 50 | 50 |
| II-8 | 4 | 5 | 5 | 6 | 50 | 50 | 50 | 50 |
| II-17 | 5 | 4 | 5 | 4 | 50 | 50 | 50 | 50 |
| II-18 | 5 | 6 | 5 | 5 | 50 | 50 | 50 | 50 |
| Art-A | 5 | 2 | 2 | 1 | 50 | 50 | 50 | 50 |
| Art-B | 5 | 5 | 2 | 2 | 50 | 50 | 50 | 50 |
| Fabric D: | | | | | | | | |
| II-7 | 5 | 5 | 5 | 4 | 70 | 50 | 50 | 50 |
| II-8 | 5 | 5 | 5 | 6 | 70 | 50 | 50 | 50 |
| II-17 | 4 | 2 | 1 | 0 | 70 | 50 | 50 | 50 |
| II-18 | 6 | 5 | 5 | 4 | 70 | 50 | 50 | 50 |
| Art-A | 5 | 1 | 0 | 0 | 70 | 50 | 50 | 0 |
| Art-B | 6 | 4 | 0 | 0 | 80 | 50 | 50 | 0 |
| Fabric E: | | | | | | | | |
| II-7 | 7 | 7 | 6 | 2 | 90 | 80 | 80 | 70 |
| II-8 | 6 | 7 | 6 | 2 | 80 | 70 | 80 | 70 |
| II-17 | 7 | 5 | 5 | 1 | 90 | 80 | 70 | 80 |
| II-18 | 7 | 6 | 5 | 2 | 80 | 80 | 70 | 70 |
| Art-A | 6 | 0 | 0 | 0 | 100 | 70 | 50 | 50 |
| Art-B | 6 | 5 | 0 | 0 | 100 | 70 | 70 | 50 |
| Fabric F: | | | | | | | | |
| II-7 | 2 | 2 | 3 | 3 | 70 | 50 | 70 | 50 |
| II-8 | 2 | 2 | 2 | 3 | 70 | 50 | 50 | 50 |
| II-17 | 2 | 2 | 2 | 2 | 70 | 50 | 50 | 50 |
| II-18 | 2 | 2 | 2 | 2 | 80 | 50 | 50 | 50 |
| Art-A | 2 | 1 | 1 | 1 | 70 | 50 | 50 | 50 |
| Art-B | 2 | 2 | 1 | 1 | 70 | 50 | 50 | 50 |

TABLE IX

| Fabric used and fluorinated copolymer used | Oil repellency | | | | Water repellency | | | |
|---|---|---|---|---|---|---|---|---|
| | Init. | 1DC | 3DC | 5DC | Init. | 1DC | 3DC | 5DC |
| Fabric A: | | | | | | | | |
| II-18 | 5 | 5 | 4 | 4 | 70 | 50 | 50 | 50 |
| II-15 | 5 | 5 | 4 | 3 | 50 | 50 | 50 | 50 |
| II-27 | 2 | 3 | 1 | 0 | 50 | 50 | 50 | 50 |
| II-22 | 5 | 4 | 4 | 4 | 70 | 50 | 50 | 50 |
| II-29 | 3 | 4 | 2 | 2 | 50 | 50 | 50 | 50 |
| Art-A | 4 | 4 | 0 | 0 | 50 | 50 | 50 | 0 |
| Art-B | 5 | 3 | 1 | 0 | 50 | 50 | 50 | 50 |
| Fabric B: | | | | | | | | |
| II-18 | 5 | 5 | 6 | 5 | 50 | 50 | 50 | 50 |
| II-15 | 6 | 6 | 5 | 5 | 70 | 50 | 50 | 50 |
| II-27 | 5 | 5 | 4 | 3 | 50 | 50 | 50 | 50 |
| II-22 | 5 | 5 | 5 | 4 | 70 | 50 | 50 | 50 |
| II-29 | 5 | 5 | 4 | 3 | 50 | 50 | 50 | 50 |
| Art-A | 4 | 2 | 0 | 0 | 70 | 50 | 50 | 50 |
| Art-B | 5 | 2 | 1 | 1 | 50 | 50 | 50 | 50 |
| Fabric C: | | | | | | | | |
| II-18 | 5 | 5 | 4 | 6 | 50 | 50 | 50 | 50 |
| II-15 | 5 | 5 | 2 | 3 | 50 | 50 | 50 | 50 |
| II-27 | 3 | 4 | 1 | 2 | 50 | 50 | 0 | 50 |
| II-22 | 5 | 6 | 3 | 5 | 50 | 50 | 50 | 50 |
| II-29 | 3 | 5 | 1 | 2 | 50 | 50 | 50 | 50 |
| Art-A | 4 | 0 | 0 | 0 | 50 | 50 | 0 | 0 |
| Art-B | 6 | 5 | 0 | 0 | 50 | 50 | 0 | 0 |
| Fabric D: | | | | | | | | |
| II-18 | 5 | 6 | 5 | 4 | 70 | 50 | 50 | 50 |
| II-15 | 4 | 5 | 2 | 2 | 70 | 50 | 50 | 50 |
| II-27 | 2 | 4 | 0 | 0 | 70 | 50 | 0 | 0 |
| II-22 | 6 | 5 | 5 | 5 | 50 | 50 | 50 | 50 |
| II-29 | 3 | 4 | 0 | 2 | 50 | 50 | 0 | 50 |
| Art-A | 3 | 0 | 0 | 0 | 50 | 0 | 0 | 0 |
| Art-B | 5 | 1 | 0 | 0 | 70 | 50 | 0 | 0 |
| Fabric E: | | | | | | | | |
| II-18 | 7 | 6 | 4 | 4 | 80 | 70 | 80 | 80 |
| II-15 | 6 | 6 | 2 | 2 | 80 | 70 | 70 | 80 |
| II-27 | 5 | 3 | 0 | 0 | 80 | 70 | 70 | 80 |
| II-22 | 6 | 7 | 4 | 3 | 80 | 70 | 80 | 70 |
| II-29 | 6 | 5 | 2 | 0 | 80 | 70 | 80 | 80 |
| Art-A | 5 | 2 | 0 | 0 | 90 | 70 | 70 | 70 |
| Art-B | 6 | 4 | 0 | 0 | 90 | 70 | 70 | 70 |
| Fabric F: | | | | | | | | |
| II-18 | 2 | 2 | 3 | 2 | 70 | 50 | 50 | 50 |
| II-15 | 2 | 2 | 2 | 2 | 70 | 50 | 50 | 50 |
| II-27 | 2 | 2 | 2 | 2 | 50 | 50 | 50 | 50 |
| II-22 | 2 | 2 | 5 | 3 | 80 | 70 | 50 | 50 |
| II-29 | 3 | 2 | 2 | 2 | 50 | 50 | 50 | 50 |
| Art-A | 4 | 1 | 0 | 0 | 70 | 0 | 50 | 50 |
| Art-B | 2 | 1 | 2 | 1 | 80 | 50 | 50 | 50 |

Table X below compares four copolymers of

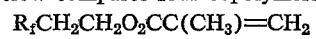

having the same composition, varying only in inherent viscosity. Two, II-38 and 41, have inherent viscosities within the range of this invention while two, II-39 and 40, have inherent viscosities below that permitted in this invention. Art polymers A and B are included for comparison.

TABLE X

| Fabric used and fluorinated copolymer used | Oil repellency | | | | Water repellency | | | |
|---|---|---|---|---|---|---|---|---|
| | Init. | 1DC | 3DC | 5DC | Init. | 1DC | 3DC | 5D7 |
| Fabric A: | | | | | | | | |
| II-45 | 3 | 3 | 2 | 2 | 50 | 50 | 50 | 50 |
| II-38 | 4 | 4 | 3 | 2 | 50 | 50 | 50 | 50 |
| II-39 | 2 | 2 | 2 | 2 | 50 | 50 | 50 | 50 |
| II-40 | 3 | 2 | 2 | 3 | 50 | 50 | 50 | 50 |
| Art-A | 4 | 1 | 0 | 0 | 50 | 50 | 0 | 50 |
| Art-B | 6 | 1 | 1 | 1 | 70 | 50 | 50 | 50 |
| Fabric B: | | | | | | | | |
| II-41 | 6 | 6 | 6 | 2 | 50 | 50 | 50 | 50 |
| II-38 | 7 | 6 | 6 | 3 | 70 | 50 | 50 | 50 |
| II-39 | 6 | 5 | 2 | 1 | 70 | 50 | 50 | 50 |
| II-40 | 6 | 5 | 0 | 2 | 70 | 50 | 50 | 50 |
| Art-A | 5 | 1 | 0 | 0 | 50 | 50 | 50 | 50 |
| Art-B | 6 | 4 | 2 | 2 | 50 | 50 | 50 | 50 |
| Fabric C: | | | | | | | | |
| II-41 | 5 | 6 | 5 | 5 | 50 | 50 | 50 | 50 |
| II-38 | 6 | 6 | 6 | 5 | 50 | 50 | 50 | 50 |
| II-39 | 4 | 5 | 2 | 2 | 50 | 50 | 50 | 50 |
| II-40 | 3 | 5 | 3 | 3 | 70 | 50 | 50 | 50 |
| Art-A | 5 | 2 | 0 | 0 | 50 | 50 | 0 | 50 |
| Art-B | 5 | 5 | 5 | 1 | 70 | 50 | 50 | 50 |
| Fabric D: | | | | | | | | |
| II-41 | 5 | 6 | 2 | 4 | 70 | 50 | 50 | 50 |
| II-38 | 4 | 5 | 3 | 3 | 70 | 50 | 50 | 50 |
| II-39 | 2 | 3 | 0 | 1 | 70 | 50 | 50 | 50 |
| II-40 | 3 | 5 | 0 | 2 | 70 | 50 | 50 | 50 |
| Art-A | 4 | 0 | 0 | 0 | 70 | 50 | 0 | 0 |
| Art-B | 5 | 2 | 0 | 0 | 70 | 50 | 50 | 50 |
| Fabric E: | | | | | | | | |
| II-41 | 7 | 5 | 2 | 2 | 80 | 50 | 80 | 70 |
| II-38 | 7 | 5 | 2 | 2 | 80 | 70 | 70 | 70 |
| II-39 | 5 | 2 | 1 | 1 | 90 | 70 | 70 | 70 |
| II-40 | 6 | 3 | 2 | 2 | 80 | 70 | 70 | 70 |
| Art-A | 5 | 0 | 0 | 0 | 90 | 70 | 70 | 70 |
| Art-B | 7 | 2 | 1 | 0 | 90 | 50 | 70 | 70 |
| Fabric F: | | | | | | | | |
| II-41 | 2 | 2 | 3 | 4 | 70 | 50 | 70 | 50 |
| II-38 | 2 | 2 | 3 | 4 | 70 | 70 | 70 | 50 |
| II-39 | 2 | 2 | 3 | 4 | 80 | 50 | 50 | 50 |
| II-40 | 2 | 2 | 2 | 2 | 70 | 50 | 50 | 50 |
| Art-A | 2 | 2 | 1 | 3 | 80 | 50 | 50 | 50 |
| Art-B | 2 | 1 | 2 | 2 | 70 | 70 | 70 | 50 |

From the foregoing tables it becomes readily apparent that the copolymers of the present invention unlike the art known polymers maintain solubility or dispersibility in the commercially preferred trichloroethylene solvent. The copolymers of this invention also display oil repellency properties superior to the art polyemrs tested even after one, three or even five dry cleanings and at the same time display at least equal and often superior water repellency properties.

EXAMPLE 3

The following formulations (F-I, F-II, F-III, F-IV) were prepared in trichloroethylene

FORMULATION

| Component | Percent OWF | | | |
|---|---|---|---|---|
| | F-I | F-II | F-III | F-IV |
| Polymer II-42 [1] | | | 1.06 | 2.12 |
| Art-polymer-A [1] | 1.06 | 2.12 | | |
| Additive-A [2] | 0.94 | 1.88 | 0.94 | 1.88 |
| Additive-B [3] | 0.50 | 0.50 | 0.50 | 0.50 |

[1] Both fluorinated polymers were 7.5% A.I. dispersions in trichlorotrifluoroethane.
[2] Additive-A.—a 14% A.I. solution of oslids, comprising 6.1% trisbehenoyloxymethyl-trismethoxymethyl-melamine, 4.5% chlorinated polyethylene, 3.4% paraffin wax and 86% trichloroethylene.
[3] Additive-B.—a 30% A.I. solution of a water repellent adjuvant-fatty amide.

The formulations were padded on the fabrics indicated in Table XI at 100% wet pickup, as described in Example 2, the fabrics were air dried, then cured at 121° C. for two minutes.
Evaluations were carried out using the test methods described in Example 2 with the results shown in Table XI. Note that Formulations I and II represent the prior art.

TABLE XI

| Fabric | Condition | Type | Repellency | | | |
|---|---|---|---|---|---|---|
| | | | F-I | F-II | F-III | F-IV |
| Super twill cotton | Init. | Oil | 4 | 5 | 5 | 6 |
| | 1DC | | 2 | 4 | 5 | 6 |
| | 3DC | | 2 | 2 | 5 | 6 |
| | Init. | Water | 80 | 80 | 70 | 70 |
| | 1DC | | 70 | 50 | 70 | 70 |
| | 3DC | | 50 | 50 | 50 | 50 |
| Men's worsted | Init. | Oil | 5 | 5 | 6 | 6 |
| | 1DC | | 2 | 4 | 6 | 6 |
| | 3DC | | 2 | 2 | 5 | 6 |
| | Init. | Water | 80 | 90 | 70 | 70 |
| | 1DC | | 70 | 70 | 70 | 70 |
| | 3DC | | 50 | 50 | 50 | 50 |
| Polypropylene | Init. | Oil | 4 | 5 | 6 | 6 |
| | 1DC | | 0 | 0 | 1 | 1 |
| | 3DC | | 0 | 0 | 0 | 0 |
| | Init. | Water | 70 | 70 | 70 | 70 |
| | 1DC | | 50 | 50 | 50 | 50 |
| | 3DC | | 50 | 50 | 50 | 50 |
| Nylon tricot auto upholstery. | Init. | Oil | 5 | 5 | 6 | 6 |
| | 1DC | | 3 | 3 | 5 | 5 |
| | 3DC | | 2 | 2 | 5 | 6 |
| | Init. | Water | 100 | 100 | 70 | 80 |
| | 1DC | | 70 | 70 | 70 | 70 |
| | 3DC | | 70 | 70 | 70 | 70 |
| Flat woven nylon auto upholstery. | Init. | Oil | 6 | 6 | 6 | 6 |
| | 1DC | | 3 | 5 | 5 | 6 |
| | 3DC | | 0 | 1 | 5 | 5 |
| | Init. | Water | 80 | 70 | 70 | 70 |
| | 1DC | | 50 | 70 | 70 | 70 |
| | 3DC | | 50 | 50 | 50 | 50 |

These data clearly show that retention of water repellency by fabrics treated with copolymers of the instant invention is at least equal to that obtained using art known polymers, while the degree of oil repellency retention, even after 3 dry cleanings, is far superior when using the terpolymers of this invention.

EXAMPLE 4

The following formulations (F–I to F–VI) were prepared in trichloroethylene and the two fluorinated polymers and Additives A and B were the same solutions as used in Example 3.

| Component | Percent OWF | | | | | |
|---|---|---|---|---|---|---|
| | F–I | F–II | F–III | F–IV | F–V | F–VI |
| Polymer-II-42 | | | | 1.56 | 2.08 | 2.60 |
| Art-polymer-A | 1.56 | 2.08 | 2.60 | | | |
| Additive-A | 1.44 | 1.92 | 2.40 | 1.44 | 1.92 | 2.40 |

These formulations were padded on the same fabrics as A, B, C and D of Example 2 at 100% wet pickup, the fabrics were air dried and cured for 1 minute at 121° C. The results are shown below in Table XII.

TABLE XII

| Fabric | Condition | Type | Repellency | | | | | |
|---|---|---|---|---|---|---|---|---|
| | | | F–1 | F–II | F–III | F–IV | F–V | F–VI |
| A | Init. | Oil | 5 | 5 | 5 | 4 | 5 | 6 |
| | 1DC | | 4 | 5 | 5 | 4 | 4 | 5 |
| | 3DC | | 2 | 2 | 3 | 4 | 5 | 5 |
| | 5DC | | 2 | 3 | 2 | 5 | 5 | 6 |
| | Init. | Water | 50 | 50 | 70 | 70 | 70 | 70 |
| | 1DC | | 50 | 50 | 50 | 70 | 70 | 70 |
| | 3DC | | 50 | 50 | 50 | 70 | 50 | 50 |
| | 5DC | | 50 | 50 | 50 | 50 | 50 | 50 |
| B | Init. | Oil | 5 | 6 | 5 | 5 | 6 | 6 |
| | 1DC | | 4 | 5 | 5 | 5 | 5 | 5 |
| | 3DC | | 1 | 2 | 0 | 5 | 5 | 5 |
| | 5DC | | 0 | 0 | 1 | 5 | 6 | 6 |
| | Init. | Water | 70 | 70 | 70 | 70 | 70 | 70 |
| | 1DC | | 50 | 50 | 50 | 50 | 50 | 50 |
| | 3DC | | 50 | 50 | 50 | 50 | 50 | 50 |
| | 5DC | | 50 | 50 | 50 | 50 | 50 | 50 |
| C | Init. | Oil | 4 | 5 | 6 | 5 | 5 | 6 |
| | 1DC | | 1 | 2 | 4 | 6 | 6 | 6 |
| | 3DC | | 2 | 3 | 4 | 5 | 5 | 6 |
| | 5DC | | 1 | 2 | 2 | 6 | 6 | 6 |
| | Init. | Water | 50 | 50 | 50 | 70 | 50 | 50 |
| | 1DC | | 50 | 50 | 50 | 50 | 70 | 70 |
| | 3DC | | 50 | 50 | 50 | 50 | 50 | 50 |
| | 5DC | | 50 | 50 | 50 | 50 | 50 | 50 |
| D | Init. | Oil | 3 | 4 | 5 | 4 | 5 | 6 |
| | 1DC | | 0 | 0 | 1 | 5 | 4 | 5 |
| | 3DC | | 0 | 0 | 0 | 4 | 5 | 5 |
| | 5DC | | 0 | 0 | 0 | 6 | 5 | 6 |
| | Init. | Water | 70 | 70 | 70 | 70 | 70 | 70 |
| | 1DC | | 0 | 50 | 50 | 70 | 50 | 50 |
| | 3DC | | 0 | 0 | 0 | 50 | 50 | 50 |
| | 5DC | | 0 | 0 | 0 | 50 | 50 | 50 |

A second set of formulations (F–I to F–VI) was prepared in methylchloroform as follows:

| Component | Percent OWF | | | | | |
|---|---|---|---|---|---|---|
| | F–I | F–II | F–III | F–IV | F–V | F–VI |
| Polymer-II-42 | | | | 1.56 | 2.08 | 2.60 |
| Art-polymer-A | 1.56 | 2.08 | 2.60 | | | |
| Additive-A | 1.44 | 1.92 | 2.40 | 1.44 | 1.92 | 2.40 |
| Additive-B | 0.5 | 0.5 | 0.5 | 0.5 | 0.5 | 0.5 |

Results are shown in Table XIII below.

TABLE XIII

| Fabric | Condition | Type | Repellency | | | | | |
|---|---|---|---|---|---|---|---|---|
| | | | F–1 | F–II | F–III | F–IV | F–V | F–VI |
| High pile-1 | Init. | Oil | 2 | 3 | 3 | 5 | 5 | 6 |
| | Init. | Water | 100 | 100 | 100 | 80 | 80 | 8 |
| High pile-2 | Init. | Oil | 2 | 2 | 4 | 4 | 4 | 5 |
| | Init. | Water | 90 | 100 | 100 | 80 | 80 | 80 |
| High pile-3 | Init. | Oil | 3 | 3 | 3 | 4 | 4 | 4 |
| | Init. | Water | 90 | 90 | 100 | 80 | 80 | 80 |

The superior oil repellency of fabrics treated with the copolymers of this invention are again apparent and it should be noted that the spectrum of treated fabrics has now been expanded to include High Pile 1, 2 and 3.

EXAMPLE 5

The following formulations were prepared in trichloroethylene:

F–I

Art-Polymer-A 7.5% solution (Example 3) 2.60 on weight of bath
Additive-A (as described in Example 3) 2.40% on weight of bath
Aluminum complex of myristic acid >0.5% on weight of bath

F–II

"Scotchgard" FC–311—Commercial product for solvent application 3.0% on weight of bath
Water repellent fatty acid-chrome complex—0.25% on weight of bath

F–III

Polymer-II–42 (7.5% A.I. in trichloroethylene) 2.60% on weight of bath—Additive-A—2.4% on weight of bath

F–IV

Formulation III also containing 0.5% Additive-B, Example 3, on weight of bath

Using a seven nozzle spray device, the designated fabrics were treated under the following conditions:

Running speed—20 yards fabric/min.
Solution delivery—0.13 gal./min. for each of 7 nozzles.
Drying conditions—1.7 min. at 93° C.
Wet pickup—50%.

The fabrics were evaluated as before with the results shown in Table XIV.

TABLE XIV

| | Formulation | | | | | | | |
|---|---|---|---|---|---|---|---|---|
| | Oil repellency | | | | Water repellency | | | |
| | F–I | F–II | F–III | F–IV | F–I | F–II | F–III | F–IV |
| Fabric: | | | | | | | | |
| A | 5 | 4 | 5 | 5 | 70 | 70 | 70 | 70 |
| B | 5 | 5 | 5 | 5 | 70 | 70 | 70 | 80 |
| C | 6 | 6 | 6 | 6 | 70 | 70 | 70 | 7 ) |
| Super twill cotton | 5 | 0 | 6 | 6 | 70 | 50 | 70 | 80 |
| Polypropylene | | | 6 | 3 | | | 70 | 80 |

These data again indicate the superior properties of the copolymers of the instant invention.

EXAMPLE 6

An art known polymer of 64 parts $$R_fCH_2CH_2O_2CC(CH_3)=CH_2$$

16 parts 2-ethylhexyl methacrylate and 1.9 parts glycidyl acrylate was prepared. The polymer had an inherent viscosity of 0.32. The polymer would not form a stable dispersion in trichloroethylene but rather precipitated.

Art polymer B, previously described, when prepared using the procedure of Example 1 had an inherent viscosity of 0.61 and was insoluble and nondispersible in trichloroethylene. If dodecyl mercaptan is added during the preparation, polymers having inherent viscosities of 0.09–0.16 are obtained which are dispersible in trichloroethylene but these lack dry-cleaning durability.

A similar copolymer was prepared from 64 parts $R_fCH_2CH_2O_2CCH=CH_2$, 12 parts lauryl acrylate and 10 parts glycidyl acrylate; inherent viscosity 0.40. It too was insoluble and nondispersible in trichloroethylene.

These data clearly show that when one or both of the comonomers is the same type as the fluoroalkylester, i.e., one or both are acrylate with a fluoroacrylate monomer, the desired result of solubility or dispersibility in trichloroethylene is not obtained.

In Example 7 the fluorinated monomers had the following characteristics:

$$R_fCH_2CH_2O_2CC(CH_3)=CH_2$$

$R_f$ is $F(CF_2)_n$— wherein $n$ is 6, 8, 10, 12 and 14 in the weight ratio 35/30/18/8/3, average molecular weight 522, 58.0% fluorine.

$$R_fCH_2CH_2O_2CCH=CH_2$$

$R_f$ is the same as above, average molecular weight 508, 59.4% fluorine.

The copolymers utilized in Example 7 and described in Table XV were prepared by the procedure described in Example 7.

EXAMPLE 7

The following general procedure was used to prepare the polymers shown in Table XV.

A solution of 100 parts of three monomers (see Table XV for specific monomers, weight percents and properties) of the indicated percentages was prepared in 192 parts of 2 to 1 mixture of 1,2-difluorotetrachloroethane and 1,1,2-trichloro-1,2,2-trifluoroethane containing 0.2 part of primary octadecyl mercaptan. The mixture was heated at 75° C. for one hour under a slow nitrogen purge, cooled to 70° C. and 0.11 part of azobisisobutyronitrile was added. Heating at 70° C. with agitation was continued for 3 hours and then a further 0.11 part of azo compound was added. Heating at 70° C. was then continued for 12 hours. The resulting solution contained about 32% polymer solids. Samples of polymer solids were obtained by evaporation of solvents for determination of inherent viscosities.

TABLE XV

| Polymer III No. | Copolymers of $R_fCH_2CH_2O_2CCX'=CH_2$ | | | | | | | Inherent viscosity 0.5% at 30° C |
|---|---|---|---|---|---|---|---|---|
| | $R_fCH_2CH_2O_2$— $CCX'=CH_2$ | | $R'O_2CCX''=CH_2$ | | | $R''O_2CCX'=CH_2$ | | |
| | X' | % | X'' | R' | % | X'' | % | |
| 1 | CH₃ | 85 | H | CH₃ | 15 | | 0 | 0.38 |
| 2 | CH₃ | 85 | H | CH₃ | 15 | | 0 | 0.16 |
| 3 | CH₃ | 85 | H | CH₃ | 13 | H | 2 | 0.41 |
| 4 | CH₃ | 85 | H | CH₃ | 10 | H | 5 | 0.16 |
| 5 | CH₃ | 75 | H | CH₃ | 25 | | 0 | 0.46 |
| 6 | CH₃ | 75 | H | CH₃ | 25 | | 0 | 0.22 |
| 7 | CH₃ | 75 | H | CH₃ | 20 | H | 5 | 0.17 |
| 8 | CH₃ | 78.1 | H | CH₃ | 14.6 | H | 7.3 | 0.63 |
| 9 | CH₃ | 74.4 | H | CH₃ | 18.6 | H | 7.0 | 0.56 |
| 10 | CH₃ | 78.1 | H | C₂H₅ | 14.6 | H | 7.3 | 0.69 |
| 11 | CH₃ | 74.4 | H | C₂H₅ | 18.6 | H | 7.0 | 0.72 |
| 12 | CH₃ | 74.4 | H | C₂H₅ | 14.0 | H | 11.6 | 0.54 |
| 13 | CH₃ | 67.8 | H | C₂H₅ | 25.4 | H | 6.8 | 0.67 |
| 14 | H | 85 | CH₃ | CH₃ | 15 | | 0 | 0.23 |
| 15 | H | 85 | CH₃ | CH₃ | 13 | CH₃ | 2 | 0.22 |
| 16 | H | 80 | CH₃ | CH₃ | 20 | | 0 | 0.23 |
| 17 | H | 80 | CH₃ | CH₃ | 18 | CH₃ | 2 | 0.25 |
| 18 | H | 75 | CH₃ | CH₃ | 25 | | 0 | 0.18 |
| 19 | H | 75 | CH₃ | CH₃ | 25 | | 0 | <0.18 |
| 20 | H | 75 | CH₃ | CH₃ | 23 | CH₃ | 2 | 0.22 |
| 21 | H | 85 | CH₃ | CH₃ | 10 | CH₃ | 5 | 0.14 |
| 22 | H | 75 | CH₃ | CH₃ | 25 | | 0 | 0.18 |
| 23 | H | 75 | CH₃ | CH₃ | 24.5 | CH₃ | 0.5 | 0.24 |
| 24 | H | 75 | CH₃ | CH₃ | 24 | CH₃ | 1 | 0.25 |
| 25 | H | 70 | CH₃ | CH₃ | 30 | | 0 | |
| 26 | H | 65 | CH₃ | CH₃ | 35 | | 0 | |

EXAMPLE 8

Selected polymers were converted to 7.5% A.I. solutions or dispersions in trichloroethylene. Pad baths were prepared using trichloroethylene to give the concentrations indicated as percent on weight of fabric (percent OWF) of the 7.5% solutions (percent OWF is the percent on weight of bath at 100% wet pickup). The baths were applied at 24° C. on fabrics with nip rolls adjusted to obtain 100% wet pickup. The padded fabrics were air dried, cured for 2 minutes at 121° C. and tested for oil and water repellency (see Table XVI) and dry soil resistance (see Table XVII).

The test fabrics used had the following characteristics: Fabric A—13 oz./yd. woven upholstery fabric, Fabric B—woven upholstery fabric, Fabric C—a 24 oz./yd. velvet, Fabric D—a 21 oz./yd. velvet, Fabric E—87% rayon, 13% cotton 12 oz./yd. woven upholstery fabric, Fabric F—25% cotton, 56% rayon, 19% acetate woven upholstery fabric, Fabric G—5 oz./yd. 100% cotton print, Fabric H—100% rayon drapery fabric.

Oil repellencies were determined using the Test Method No. 118–1966T of the American Association of Textile Chemists and Colorists, modified in that the test oils contained a blue dye dissolved therein and the readings were taken after three minutes rather than the 30 seconds required by the test. Water repellencies were determined by Test Method No. 22–1964 of the American Association of Textile Chemists and Colorists. The results are seen in Table XVI below.

TABLE XVI
[0.225% polymer solids OWF in all cases]

| Polymer III- | Repellencies—Fabric | | | | | | | | | | | | | |
|---|---|---|---|---|---|---|---|---|---|---|---|---|---|
| | Fabric A | | Fabric B | | Fabric C | | Fabric D | | Fabric E | | Fabric F | | Fabric G | |
| | Oil | Water | Oil | Water | Oil | Water | Oil | Water | Oil | Water | Oil | Water | Oil | Water |
| 1 | 6 | 50 | | | | | 3 | 50 | 6 | 70 | 6 | 70 | | |
| 2 | 6 | 70 | | | 4 | 70 | | | 6 | 50 | | | | |
| 3 | 6 | 50 | | | | | 4 | 80 | 6 | 50 | 6 | 70 | | |
| 4 | 5 | 50 | | | | | 2 | 70 | 6 | 50 | 6 | 70 | | |
| 5 | 6 | 70 | | | | | 3 | 50 | 6 | 70 | 6 | 70 | | |
| 6 | 6 | 70 | | | 5 | 80 | | | 6 | 70 | | | | |
| 7 | 5 | 70 | | | 2 | 70 | | | 6 | 70 | 5 | 50 | | |
| 8 | 3 | 50 | 4 | 70 | | | 2 | 70 | 5 | 70 | 5 | 50 | 1 | 70 |
| 10 | 6 | 50 | 5 | 50 | | | 3 | 70 | 6 | 50 | 5 | 50 | 2 | 70 |
| 14 | 6 | 50 | | | | | 3 | 50 | 6 | 50 | 6 | 80 | | |
| 15 | 6 | 70 | | | 3 | 50 | | | 6 | 70 | | | | |
| 16 | 6 | 70 | | | 3 | 80 | | | 6 | 70 | | | | |
| 17 | 6 | 70 | | | 3 | 80 | | | 6 | 50 | | | | |
| 18 | 6 | 50 | 5 | 70 | 3 | 50 | 3 | 50 | 6 | 70 | 6 | 70 | 4 | 70 |
| 19 | 6 | 70 | | | 3 | 50 | | | 6 | 70 | | | | |
| 20 | 4 | 70 | | | 2 | 70 | | | 6 | 70 | | | | |
| 21 | 6 | 50 | | | | | 2 | 70 | 3 | 50 | 7 | 70 | | |
| 22 | 6 | 80 | 6 | 70 | 2 | 50 | | | 6 | 70 | | | | |
| 23 | 6 | 70 | 5 | 70 | 2 | 80 | 2 | 80 | 6 | 50 | | | 5 | 70 |
| 24 | 6 | 70 | 6 | 70 | 5 | 90 | | | 7 | 80 | | | | |
| 25 | 6 | 70 | 5 | 50 | | | 3 | 70 | 6 | 70 | | | 4 | 80 |
| 26 | 4 | 70 | 4 | 70 | | | 1 | 50 | 5 | 70 | | | 2 | 70 |

Dry soil resistance was tested in the following manner: Two fabric specimens (4 x 4 inch) were folded in half, face side out and placed on the two blades of an Accelerotor Type AB-7 (Atlas Electric Devices Co., Chicago, Ill.—without abrasive liner, 4.5 inch S type rotor). One specimen was polymer treated, the other untreated. The device was closed, 0.2 g. of soil (see below) was introduced and the device was run at 3000 r.p.m. for 30 sec. Each specimen was then placed in a No. 5 Standard Buechner funnel fitted with an acrylic cap containing twenty-five 3/16 inch holes in a rectangular pattern and one 1/4 inch hole near the edge as an air inlet and held on the funnel with a two-pound weight. Air at 40 p.s.i.g. was passed through the quarter-inch hole for one minute to remove excess soil. The two-fabric samples were then placed on a white blotter adjacent to each other. Dry soil resistance was rated according to the following system:

0 = Worse soiling of treated versus untreated sample.
50 = Soiling of treated and untreated samples equal.
70 = Soiling of treated sample slightly better than untreated sample.
80 = Soiling of treated sample noticeably better than untreated sample.
90 = Soiling of treated sample considerably better than untreated sample.
100 = Soiling produces no visible effect versus unsoiled fabric sample.

The soil consisted of:

| | Percent |
|---|---|
| Peat moss | 38 |
| Cement | 17 |
| Kaolin clay | 17 |
| Silica | 17 |
| Furnace black | 1.75 |
| Red iron oxide | 0.50 |
| Mineral oil (white) | 8.75 | and was the so-called "Cyanamide soil."

EXAMPLE 9

Additional copolymer solids, not within the scope of this invention, were prepared as in Example 7 for purposes of comparison. These copolymer solids which will be designated as C-1 consisted of 1 part of a polymer having the following properties:

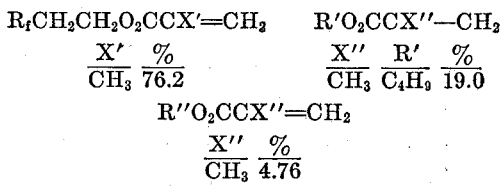

and 2 parts of a polymer having the following properties:

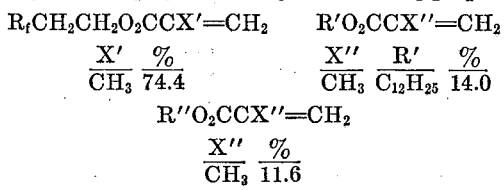

$R_f$ and $R''$ being the same in Example 7. The results can be seen below in Table XVII.

TABLE XVII
[0.225% polymer solids OWF in all cases]

| Polymer III | Dry soil results—Fabric | | | | | | | |
|---|---|---|---|---|---|---|---|---|
| | A | B | C | D | E | F | G | H |
| 1 | 70 | | | 70 | 70 | 0 | | 80 |
| 2 | 80 | | | 0 | 70 | | | 80 |
| 3 | 80 | | | 80 | 80 | 70 | | 90 |
| 4 | | | | 80 | 80 | 70 | | |
| 5 | 80 | | | 80 | 70 | | | 80 |
| 6 | 90 | | | 50 | 70 | | | 90 |
| 7 | 70 | | | 80 | 70 | 0 | | 90 |
| 8 | 70 | 70 | | 70 | 80 | | 80 | |
| 10 | 70 | 70 | | 70 | 70 | | 70 | |
| 14 | 80 | | | 90 | 80 | 0 | | 80 |
| 16 | 0 | | | 70 | 70 | | | 90 |
| 17 | 80 | | | 70 | 70 | | | 80 |
| 18 | 80 | | | 90 | 80 | 70 | | 90 |
| 19 | 80 | | | 70 | 80 | | | 80 |
| 20 | 80 | | | 70 | 70 | | | 80 |
| 21 | | | | 90 | 80 | 50 | | |
| 23 | 80 | 70 | 70 | | 70 | | 80 | |
| 25 | 70 | 80 | 50 | | 70 | | 70 | |
| 26 | 70 | 80 | 50 | | 70 | | 70 | |

Example 8 was repeated utilizing commercial application equipment to show a comparison of oil and water repellency and dry soil resistance between the copolymers of the present invention and C-1. The test results are shown below in Table XVIII.

TABLE XVIII

| Fabric | Concentration on fabric* | Copolymer | | | | | | | | |
|---|---|---|---|---|---|---|---|---|---|---|
| | | C-1 repellency | | | III-23 repellency | | | III-4 repellency | | |
| | | Oil | Water | Dry soil | Oil | Water | Dry soil | Oil | Water | Dry soil |
| C | 2 | 0 | 70 | 50 | 2 | 70 | 80 | 3 | 80 | 80 |
| C | 1 | 0 | 0 | 50 | 1 | 70 | 80 | 1 | 70 | 80 |
| D | 2.25 | 0 | 70 | 50 | 2 | 70 | 80 | 2 | 80 | 80 |
| D | 1.13 | 0 | 0 | 50 | 1 | 0 | 80 | 1 | 70 | 80 |
| A | 3.7 | 5 | 50 | 0 | 6 | 50 | 80 | 6 | 70 | 80 |
| A | 1.9 | 2 | 50 | 0 | 5 | 50 | 80 | 4 | 70 | 80 |
| E | 4.0 | 5 | 70 | 50 | 7 | 70 | 80 | 6 | 70 | 80 |
| E | 2.0 | 4 | 0 | 70 | 4 | 50 | 80 | 5 | 70 | 80 |
| G | 9.6 | 5 | 80 | 70 | 6 | 80 | 90 | 6 | 100 | 80 |
| G | 4.8 | 4 | 70 | 70 | 6 | 70 | 90 | 5 | 70 | 80 |

*Concentration on fabric=percent of 7.5% A.I. dispersions on weight of fabric.

These data clearly show that when the comonomers are the same type as the fluoroalkylester, i.e., they are methacrylate with a fluoromethacrylate monomer, the desired oil and water repellency and dry soil resistance are not obtained.

The foregoing detailed description has been given for clarity of understanding only and no unnecessary limitations are to be understood therefrom. The invention is not limited to exact details shown and described for obvious modifications will occur to one skilled in the art.

The embodiments of the invention in which an exclusive property or privilege is claimed are defined as follows:

1. Solvent soluble dry soil resistant oil and water repellent random, addition copolymers selected from (I) copolymers consisting essentially of units derived from
(a) $R_fCH_2CH_2O_2CCH=CH_2$, and
(b) $R'O_2CC(CH_3)=CH_2$ and optionally
(c) $R''O_2CC(CH_3)=CH_2$ wherein $R_f$ is a perfluoroalkyl group having from four to fourteen carbon atoms, $R'$ is an alkyl group having from one to eighteen carbon atoms and $R''$ is a glycidyl group; and wherein the sum of (b) and (c) is from about 15 percent to 35 percent by weight of the copolymer, with the proviso that when $R'$ contains more than 2 carbon atoms, (b) is at least 5 percent by weight and (c) is at least 7 percent by weight of the copolymer and when $R'$ contains from 1 to 2 carbon atoms, (c) does not exceed 12 percent by weight of the copolymers; and (II) copolymer consisting essentially of units derived from
(a') $R_fCH_2CH_2O_2CC(CH_3)=CH_2$, and
(b') $R'O_2CCH=CH_2$ and optionally
(c') $R''O_2CCH=CH_2$ wherein $R_f$, $R'$ and $R''$ are as defined in I; and wherein the sum of (b') and (c') is from about 15 percent to 35 percent by weight of the copolymer, with the proviso that when $R'$ contains more than 2 carbon atoms, the sum of (b') and (c') is from 21 percent to 34 percent by weight of the copolymer, (b') is at least 5 percent by weight and (c') is at least 6.8 percent by weight of the copolymer and when $R'$ contains from 1 to 2 carbon atoms, (c') does not exceed 12 percent by weight of the copolymer;

and wherein the inherent viscosity of each copolymer I and II as a 0.5 percent solution in trichlorotrifluoroethane at 30° C. is from 0.05 to 0.8.

2. Copolymers according to claim 1 wherein the inherent viscosity of each copolymer I and II as a 0.5 percent solution in trichlorotrifluoroethane at 30° C. is from about 0.27 to 0.8.

3. Copolymers according to claim 2 wherein $R'$ is an alkyl group having from 8 to 12 carbon atoms.

4. Copolymers according to claim 2 wherein $R_f$ has the formula $F(CF_2)_n$ wherein $n$ is 4 to 14.

5. Copolymers according to claim 4 wherein $n$ in the formula $F(CF_2)_n$ has the numerical values 6, 8, 10, 12 and 14 present in a weight ratio of 35/30/18/8/3.

6. Copolymers according to claim 5 wherein $R'$ is an alkyl group having from 8 to 12 carbon atoms.

7. Copolymer I of claim 2 wherein $R_f$ in the monomers has the formula $F(CF_2)_n$ wherein $n$ is 4 to 14.

8. Copolymers according to claim 7 wherein $n$ in the formula $F(CF_2)_n$ has the numerical values 6, 8, 10, 12 and 14 present in a weight ratio of 35/30/18/8/3, wherein the average molecular weight of the perfluorinated monomer is 508, and wherein said perfluorinated monomer contains 59.4 percent by weight of fluorine.

9. Copolymers according to claim 8 wherein $R'$ is an alkyl group having from 8 to 12 carbon atoms.

10. Copolymer II of claim 2 wherein $R_f$ in the monomers has the formula $F(CF_2)_n$ wherein $n$ is 4 to 14.

11. Copolymers according to claim 10 wherein $n$ in the formula $F(CF_2)_n$ has the numerical values 6, 8, 10, 12 and 14 present in a weight ratio of 35/30/18/8/3, wherein the average molecular weight of the perfluorinated monomer is 522, and wherein said perfluorinated monomer contains 58.0 percent by weight of fluorine.

12. Copolymers according to claim 11 wherein $R'$ is an alkyl group having from 8 to 12 carbon atoms.

13. Copolymers according to claim 11 containing about 74 percent to 75 percent by weight of

$$R_fCH_2CH_2O_2CC-(CH_3)=CH_2$$

14. Copolymers according to claim 13 containing about 74.4 percent by weight of $R_fCH_2CH_2O_2CC(CH_3)=CH_2$, about 14.0 percent by weight of 2-ethylhexyl acrylate, and about 11.6 percent by weight of glycidyl acrylate.

15. Copolymers according to claim 14 having inherent viscosities as 0.5 percent solutions in trichlorotrifluoroethane at 30° C. of from about 0.47 to 0.67.

16. Copolymers according to claim 1 wherein $R'$ is an alkyl group having 1-2 carbon atoms.

17. Copolymers according to claim 16 wherein each (c) of copolymer I and (c') of copolymer II is no more than 12 percent by weight of the copolymer.

18. Copolymers according to claim 17 wherein $R_f$ has the formula $F(CF_2)_n$ wherein $n$ is 4 to 14.

19. Copolymers according to claim 18 wherein $n$ in the formula $F(CF_2)_n$ has the numerical value 6, 8, 10, 12 and 14 present in a weight ratio of 35/30/18/8/3.

20. Copolymer I of claim 17 wherein $R_f$ in the monomer has the formula $F(CF_2)_n$ wherein $n$ is 4 to 14.

21. Copolymers according to claim 20 wherein $n$ in the formula $F(CF_2)_n$ has the numerical values 6, 8, 10, 12 and 14 present in a weight ratio of 35/30/18/8/3, wherein the average molecular weight of the perfluorinated monomer in 508, and wherein said perfluorinated monomer contains 59.4 percent by weight of fluorine.

22. Copolymers according to claim 21 containing about 75 percent by weight of $R_fCH_2CH_2O_2CCH=CH_2$, 24.5 percent by weight of methyl methacrylate, and 0.5 percent by weight of glycidal methacrylate.

23. Copolymers according to claim 22 having inherent viscosities at 0.5 percent solutions in trichlorotrifluoroethane at 30° C. of from about 0.15 to 0.25.

24. Copolymer II of claim 17 wherein $R_f$ in the monomers has the formula $F(CF_2)_n$ wherein $n$ is 4 to 14.

25. Copolymers according to claim 24 wherein $n$ in the formula $F(CF_2)_n$ has the numerical values 6, 8, 10, 12 and 14 present in a weight ratio of 35/30/18/8/3, wherein the average molecular weight of the perfluorinated monomer is 522, and wherein said perfluorinated monomer contains 58.0 percent by weight of fluorine.

26. Copolymers according to claim 25 containing about 85 percent by weight of $R_fCH_2CH_2O_2CC(CH_3)=CH_2$, 10 percent by weight of methyl acrylate, and 5 percent by weight of glycidal acrylate.

27. Copolymers according to claim 26 having inherent viscosities as 0.5 percent solutions in trichlorotrifluoroethane at 30° C. of from about 0.15 to 0.25.

References Cited
UNITED STATES PATENTS

| | | |
|---|---|---|
| 3,277,039 | 10/1966 | Marascia et al. |
| 3,282,905 | 11/1966 | Fasick et al. |
| 3,378,609 | 4/1968 | Fasick et al. |
| 3,459,696 | 8/1969 | Read. |

FOREIGN PATENTS

| | | |
|---|---|---|
| 1,058,955 | 2/1967 | England. |

JOSEPH L. SCHOFER, Primary Examiner

S. M. LEVIN, Assistant Examiner

U.S. Cl. X.R.

260—28.5 D, 32.8 R, 33.4 F, 33.6 F, 33.8 F, 86.1 E, 853, 859 R, 878 R, 884; 117—138.8 UF, 139.5 A, 141, 143 A